United States Patent
Bae et al.

(10) Patent No.: US 10,582,724 B2
(45) Date of Patent: Mar. 10, 2020

(54) EQUIPMENT AND METHOD FOR PRODUCING FIBER FEED BY USING PALM-PROCESSING BY-PRODUCTS

(71) Applicants: Hee Dong Bae, Suwon-si, Gyeonggi-do (KR); IL-SUNG CONSTRUCTION CO., LTD., Incheon (KR)

(72) Inventors: Hee Dong Bae, Suwon-si, Gyeonggi-do (KR); Kang Jin In, Ansan-si (KR); Cheul Hyun Moon, Anyang-si (KR); Byeong Cheol Seong, Incheon (KR); Kyu Jin Oh, Ansan-si (KR)

(73) Assignees: Hee Dong Bae, Suwon-si, Gyeonggi-do (KR); IL-SUNG CONSTRUCTION CO., LTD., Incheon (KR)

( * ) Notice: Subject to any disclaimer, the term of this patent is extended or adjusted under 35 U.S.C. 154(b) by 723 days.

(21) Appl. No.: 14/910,090

(22) PCT Filed: Jul. 30, 2014

(86) PCT No.: PCT/KR2014/006983
§ 371 (c)(1),
(2) Date: Feb. 4, 2016

(87) PCT Pub. No.: WO2015/020347
PCT Pub. Date: Feb. 12, 2015

(65) Prior Publication Data
US 2016/0192695 A1 Jul. 7, 2016

(30) Foreign Application Priority Data
Aug. 7, 2013 (KR) .................. 10-2013-0093809

(51) Int. Cl.
A23N 17/00 (2006.01)

(52) U.S. Cl.
CPC ......... *A23N 17/005* (2013.01); *A23N 17/007* (2013.01)

(58) Field of Classification Search
CPC ..... A23N 17/005; A23N 17/00; A23N 17/007
See application file for complete search history.

(56) References Cited

U.S. PATENT DOCUMENTS

| | | | | |
|---|---|---|---|---|
| 3,251,702 A | * | 5/1966 | Stickley | C08B 30/16 106/122 |
| 5,379,574 A | * | 1/1995 | Fischer | B65B 5/024 53/202 |

(Continued)

FOREIGN PATENT DOCUMENTS

| | | |
|---|---|---|
| JP | 09-168367 A | 6/1997 |
| JP | 11-075711 A | 3/1999 |

(Continued)

OTHER PUBLICATIONS

Jin (KR 1020130000943) Machine Translation (Year: 2013).*

*Primary Examiner* — Felicia C Turner
(74) *Attorney, Agent, or Firm* — Rabin & Berdo, P.C.

(57) ABSTRACT

The present invention uses empty fruit bunch (EFB) and fiber so as to crush and cut over a crushing process, adds water, adds soluble sugar and protein and mixes the same in an appropriate ratio, compresses the same to remove air, seals and leaves the same alone at a temperature of approximately 25 DEG C. for at least 30 days, and supplies process-completed products as fiber and energy feed for ruminants.

3 Claims, 2 Drawing Sheets

(56) References Cited

U.S. PATENT DOCUMENTS

| | | | | |
|---|---|---|---|---|
| 6,190,461 | B1* | 2/2001 | Alack | B01F 3/1271 |
| | | | | 127/22 |
| 2002/0044994 | A1* | 4/2002 | Spencer | A23D 9/06 |
| | | | | 426/312 |
| 2006/0160907 | A1 | 7/2006 | Stamp | |
| 2006/0292264 | A1* | 12/2006 | Young | A23K 10/12 |
| | | | | 426/33 |

FOREIGN PATENT DOCUMENTS

| | | |
|---|---|---|
| KR | 10-2004-0102963 A | 12/2004 |
| KR | 10-2005-0083878 A | 8/2005 |
| KR | 10-0938490 B1 | 1/2010 |
| KR | 10-2011-0090850 A | 8/2011 |
| KR | 10-2013-0000943 A | 3/2013 |
| KR | 10-1265740 B1 | 5/2013 |

* cited by examiner

EQUIPMENT AND METHOD FOR PRODUCING FIBER FEED BY USING PALM-PROCESSING BY-PRODUCTS

TECHNICAL FIELD

The present invention relates to the development of fermented fibered feed which can be fed to livestock, using an empty fruit bunch (EFB) which is generated during the palm oil mill process and a palm fiber which is contained in the seed, and in particular, to equipment for producing fermented fibered feed using palm by-products and a producing method thereof, which make it possible to analyze physicochemical properties of the empty fruit bunch (EFB) and the palm fiber and facilitate the growth of microorganisms so as to ferment microorganisms significantly, thereby providing a fiber source necessary for livestock, and which maximize the utilization of poly phenol contained in the fiber to continuously produce and feed fermented fibered feed in order to prevent the diarrhea of the livestock and improve the utilization efficiency of proteins.

BACKGROUND ART

Palm oil is extracted by removing the seeds through the steam process. Herein, after the seeds are removed, lots of by-products are generated, which called empty fruit bunch (EFB), and the one generated from the seeds is called palm fiber (PF).

Up to now, since there has been a difficulty in processing these substances, the substances have been generally used as compost or fuel for producing the steam. However, there are too many by-products generated, and in order to use the by-products as compost or fuel, a space for storing the by-products is required. Further, as a given decay period is needed, a large space and time are additionally required, and lots of costs are spent for conveying it. For these reasons, there has been a difficulty in utilizing the by-products.

In particular, severer methods of utilizing the by-products as new renewable energy have been studied; however, there are many problems that the by-products contain too much water to be used as fuel, so the low-heating value is low, and thus, lots of the by-products are needed in order to incinerate them, which makes it difficult to put enough expenses for managing the by-products.

For the technique for processing palm oil mill waste, "Method for Preparing Biofertilizer Using Palm Oil Mill Wastage" (Korean Patent No. 10-0938490; Patent Literature 1) introduces a process of carbonizing a kernel shell, incinerating EFB, treating palm oil mill effluent (POME) with micro air bubbles and filtering the treated POME to obtain decanter cake, mixing them, and maturing the mixture to produce a biofertilizer.

However, the above technique has a problem that the consumption of energy sources occurs since EFB is carbonized and incinerated.

As another technique relating to a method of utilizing waste in the palm oil mill process, "Treatment Equipment Using Palm By-Products and Palm Oil Mill Effluent which is Finally Discharged in the Palm Oil Producing Process and a Method thereof" (Korean Patent No. 10-1265740; Patent Literature 2) which was filed by the present applicant and patented, provides the technology for processing palm oil decanter cake (PODC) and palm kernel cake (PKC) together with palm oil mill effluent (POME) so that the final effluent and palm by-products can be used as energy sources, feed resources, etc.

However, Patent Document 2, which relates to the integral processing method, is suitable for the treatment of POME, PODC or PKC, but has a problem that the method cannot be used for the treatment of an empty fruit bunch (EFB) or palm fiber (PF).

So far, the empty fruit bunch (EFB) or palm fiber (PF) have been used as fuel, and recently, they have been used for producing paper in the paper industry. However, such method has a problem that a huge amount of waste water is generated, which leads to lots of costs to be spent for processing the waste water and low economic efficiency.

Other than the above, various methods such as producing a board or producing fuel by producing a compressed pellet have been developed, but the methods have not been generalized due to their low economic efficiency and the complex processing process.

In particular, since the palm fiber (PF) is voluminous and contains a large content of poly phenol, the availability is greatly reduced, and the decay is fast. For this reason, it was difficult to utilize PF efficiently.

In addition, the empty fruit bunch and the palm fiber can be used as renewable energy by drying and pulverizing EFB and PF and compressing them to be pelletized. However, the cost for producing it is greatly increased as the amount of electricity used is increased and the amount of drying is introduced, etc., and thus the effectiveness becomes greatly reduced.

As such, in the palm industry, the treatment of the empty fruit bunch and the palm fiber remains as the most difficult problem in processing waste.

However, while the empty fruit bunch and the palm fiber have a disadvantage that they contain a large content of poly phenol (Lignin), they also have an advantage that they contain a large content of fibers and some of them contain oils, so if they are processed and used efficiently, they can be utilized as good feed materials with the greatly increased usability.

Thus, the effective treatment of the empty fruit bunch and the palm fiber has a significant meaning in the palm industry, and it is an important task to develop a continuous and economical method which can maintain the utilization stable.

CITATION LIST

Patent Literature

[Patent Literature 1]
Korean Patent No. 10-0938490 (Jan. 21, 2010)
[Patent Literature 2]
Korean Patent No. 10-1265740 (May 13, 2013)

DISCLOSURE

Technical Problem

The invention has been made to solve the problems of the related art, and an object of the invention is to provide an equipment for producing fermented fibered feed using palm by-products and a method thereof capable of effectively producing fermented fibered feed so as to use it as a fibered feed by analyzing biochemical properties of an empty fruit bunch (EFB) and a palm fiber (PF) and remarkably improving the problems thereof.

More concretely, it uses an empty fruit bunch (EFB) generated from a fresh fruit bunch (FFB) having seeds, after the seeds are removed, so as to crush and cut into a length of 10 to 50 mm over a crushing process, adds water wherein the water content of the raw material is controlled to 75% or less, adds soluble sugar (solid standards: 3-15%) and protein (solid standards: 5-25%) and mixes the same in an appropriate ratio, compresses the same to remove air, seals and leaves the same alone at a temperature of approximately 25 DEG C for at least 30 days, and supplies process-completed products as fiber and energy feed for ruminants.

Especially, a poly phenol is combined with a soluble protein produced from microorganism by promoting the growth of bacteria and the growth condition of the bacteria is effectively set up so as to decrease the toxicity of the poly phenol and the raw material of the protein is inserted therein so as to increase the insufficient supply capacity of the protein.

Technical Solution

According to one aspect of the present invention so as to accomplish these objects, there is provided to an equipment for producing fermented fibered feed using palm by-products, including: a cutter (2) configured so that a raw material containing any one selected from empty fruit bunch and the palm fiber is supplied at its one side, and configured to cut the supplied raw material into a constant size; a raw material storage tank (3) that stores the raw material cut at the cutter (2); a clean water storing tank (15) in which clean water is stored; a sugar storage tank (7) in which soluble sugar is stored; a sugar melting tank (8) connected with the clean water storing tank (15) and the sugar storage tank (7) and in which the clean water and the soluble sugar are supplied so that the sugar is melted in the clean water; a first mixer (6) that receives the cut raw material and the sugar melted in the clean water from the raw material storage tank (3) and the sugar melting tank (8), respectively, and mixes the raw material and the sugar melted in the clean water supplied from the raw material storage tank (3) and the sugar melting tank (8); a protein storage tank (9) in which a protein source containing any one selected from palm kernel cake (PKC) or palm oil decanter cake (PODC) powder is stored; a mineral storage tank (12) in which mineral is stored; a second mixer (17) that mixes the raw materials discharged at the first mixer (6), the protein storage tank (9) and the mineral storage tank (12); a dual compressor (19) configured to receive the raw material mixed at the second mixer (17) and dual-compress it; a packing device (20) that packs the raw material dual-compressed at the dual compressor (19); and a maturing storage tank (22) that stores the raw material packed at the packing device (20).

At this time, the second mixer (17) is selected from a ribbon mixer or pedal mixer.

According to another aspect of the present invention so as to accomplish these objects, there is provided to a method of producing fermented fibered feed using palm by-products by using the equipment, including: a cutting step of cutting a raw material containing any one selected from the empty fruit bunch and the palm fiber into a length of 10 to 50 mm using the cutter (2) and then storing it in the raw material storage tank (3); a sugar melting step of mixing the clean water stored in the clean water storing tank (15) and the soluble sugar stored in the sugar storage tank (7) in the sugar melting tank (8) so that the soluble sugar is melted in the clean water; a first mixing step of mixing the cut raw material stored in the raw material storage tank (3) and the clean water in which soluble sugar is melted at the sugar melting tank (8) using the first mixer (6) to prepare a first mixture; a second mixing step of mixing the protein source containing any one selected from the palm kernel cake and palm oil decanter Cake stored in the protein storage tank (9), the mineral stored in the mineral storage tank (12), and the first mixture at the second mixer (17) to prepare a second mixture; a compressing step of dual-compressing the second mixture at the dual compressor (19); a packing step of packing the second mixture which goes through the compression step at the packing device (20); and a maturing step of maturing the second mixture which goes through the packing step at the maturing storage tank (22).

At this time, the melting concentration at the sugar melting step is 22 to 28%; the clean water in which the soluble sugar is melted is mixed by 3 to 15 parts by weight with respect to 100 parts by weight of the cut raw material; the protein source in the second mixing step is added by 5 to 25 parts by weight with respect to 100 parts by weight of the cut raw material; and the maturing step is performed for 30 to 90 days at a temperature of 23 to 35° C.

Advantageous Effects

According to the present invention, as empty fruit bunch and palm fiber, which are difficult to be processed in the palm industry, are produced as feed, they can be processed stably and continuously and can be stored for a long time so that a high economic efficiency can be maintained, and a storage space can be significantly reduced.

Especially, it greatly increase the activation of microorganisms, so the toxicity of poly phenol contained in empty fruit bunch and the palm fiber can be greatly reduced, and the flavor and the paratability can be improved through the lactic acid fermentation.

More specifically, since the availability of empty fruit bunch and palm fiber is very low, they have been used as compost or fuel for producing the steam required in the palm oil mill factories. However, according to the present invention, it is expected that the availability as compost can be greatly increased and this may greatly contribute to the creation of gain of the palm oil industry.

In particular, in case where empty fruit bunch and palm fiber are used as compost, not only a method of processing empty fruit bunch and palm fiber, which are very difficult to be processed stably and continuously, and storing them for a long time can be obtained, but also the high economic efficiency can be maintained, and the storage space can be significantly reduced.

Also, according to the present invention, the activation of microorganisms is remarkably increased, so the toxicity of poly phenol contained in empty fruit bunch and the palm fiber can be greatly reduced, and lactic acid fermentation occurs, which improves the flavor, thereby improving the paratability.

In addition, according to the present invention, a high value product can be produced as compared to conventional methods of treating empty fruit bunch and palm fiber (using them as compost and fuel); the treatment space can be reduced; an amount of power required for producing a compressed pellet fuel in a conventional manner can be greatly reduced; and the production cannot be affected by the time due to the improved storability.

BRIEF DESCRIPTION OF DRAWINGS

The above and other objects, features and advantages of the present invention will be more apparent from the following detailed description taken in conjunction with the accompanying drawings, in which.

REFERENCE SIGNS LIST

Figure 1:
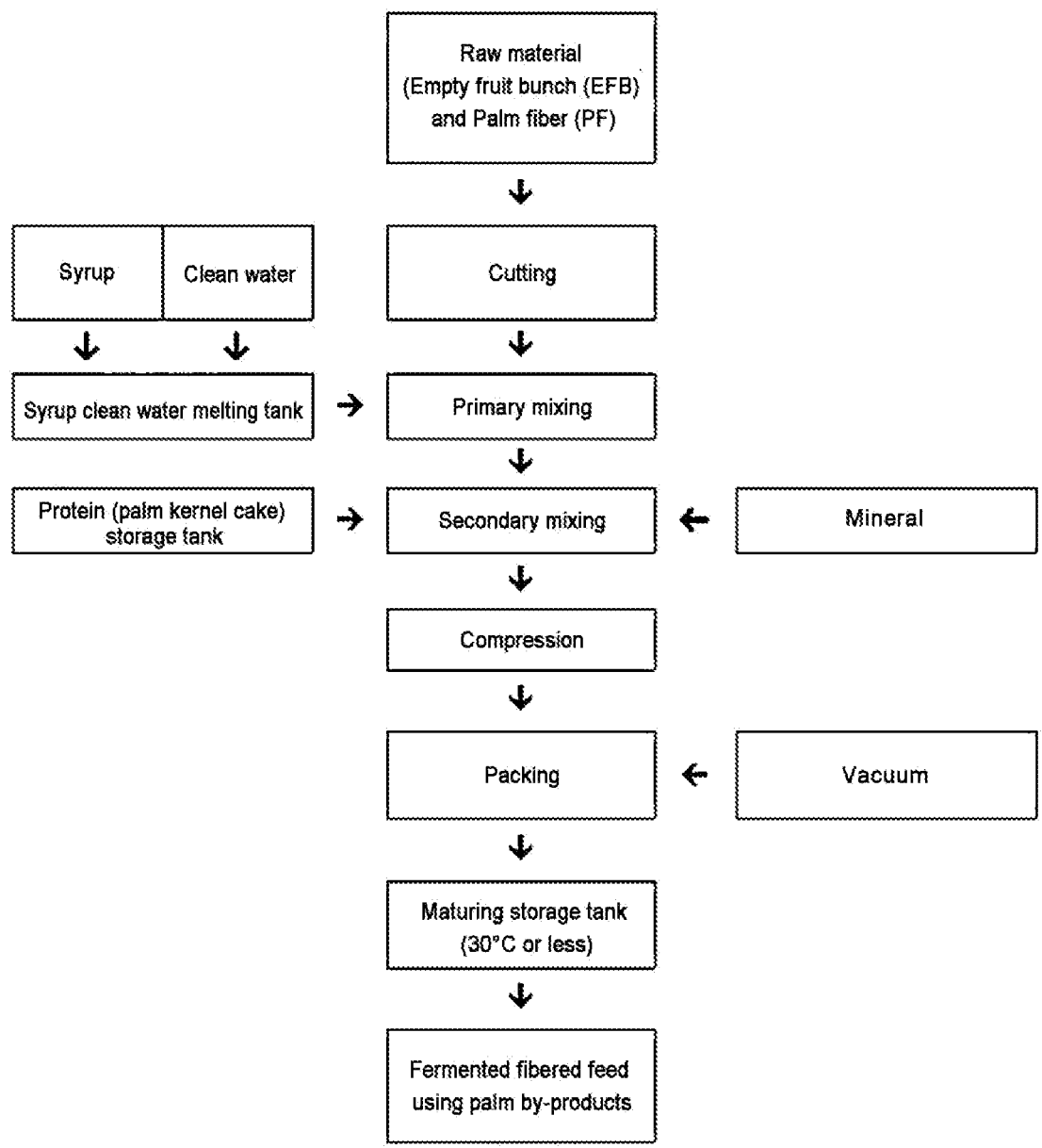
FIG. 1 is a block diagram showing an equipment for producing fermented fibered feed using palm by-products according to the present invention.
Figure 2:
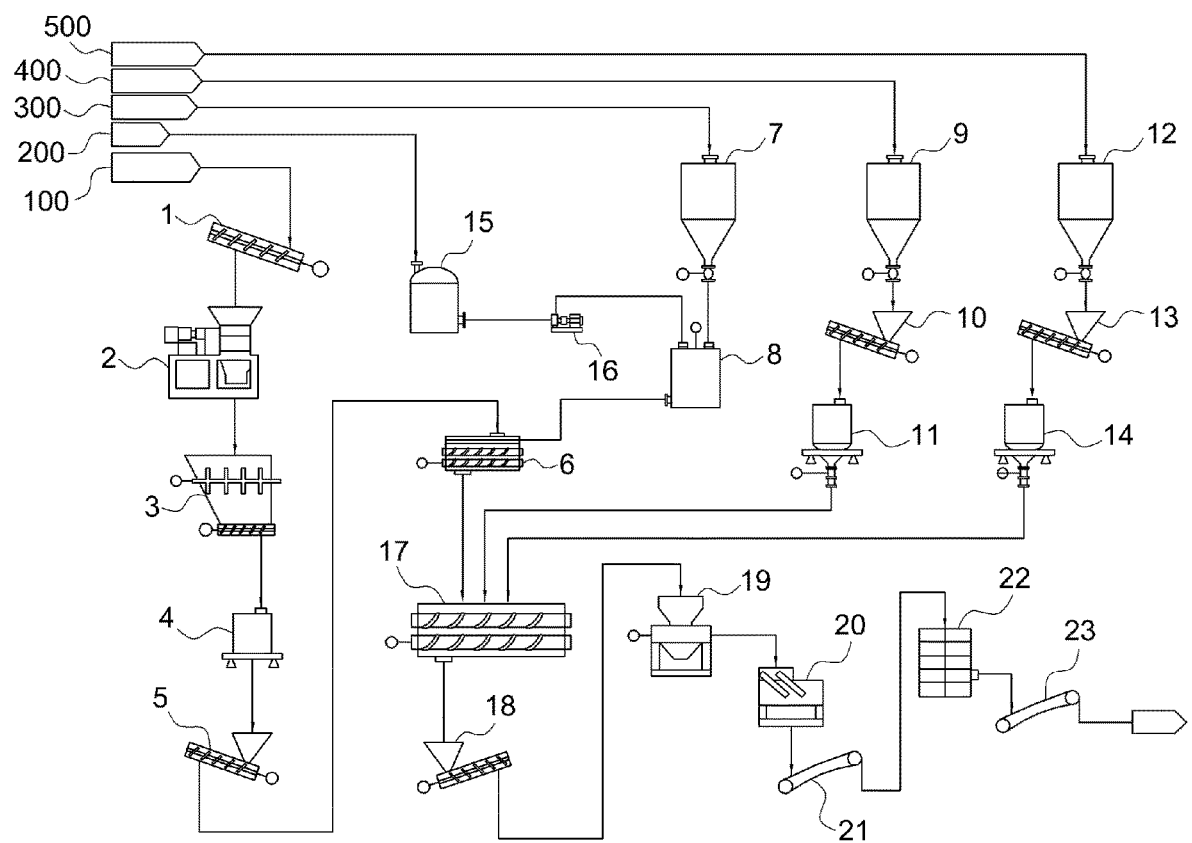
FIG. 2 is a process chart showing a method for producing fermented fibered feed using palm by-products according to the present invention.

1: transfer conveyer
2: cutter
3: raw material storage tank
4: fixed amount metering device
5: transfer conveyer
6: first mixer
7: sugar storage tank
8: sugar melting tank
9: protein storage tank
10: supply conveyer
11: fixed amount metering device
12: mineral storage tank
13: supply conveyer
14: fixed amount metering device
15: clean water storing tank
16: clean water supply pump
17: second mixer
18: mixture transfer conveyer
19: dual compressor
20: packing device
21: package transfer conveyer
22: maturing storage tank
23: discharge conveyer
100: raw material
200: clean water
300: sugar
400: protein source
500: mineral

BEST MODE

Mode for Invention

Generally, when producing palm oil, empty fruit bunch (EFB), which is discharged after sterilizing it by injecting a high temperature of steam into fresh fruit bunch (FFB) and going through a palm oil removing process, and palm fiber (PF), which is generated after extracting oil from the palm, are discharged at a high temperature of approximately 100° C., and are finally discharged through the additional milling process to increase the amount of the oil extracted.

As such, the empty fruit bunch and the palm fiber, which are generated during the palm oil mill process, contain water in an amount of 60% or less, so it is very hard to maintain the activation of microorganism.

In addition, the content of non-structural carbohydrate capable of easily using by means of the microorganism is also low.

Further, since the empty fruit bunch and the palm fiber contain a high content of poly phenol (lignin), the paratability is reduced when livestock intakes them, and polyphenol is combined with protein to incapacitate the function of protein, thereby greatly limiting the protein availability and reducing digestibility to decrease the productivity.

Thus, in the past, there have been many interests in utilizing them as fuel or compost, rather than using them as feed.

However, the empty fruit bunch and palm fiber, which are raw materials to be processed, are generated in a great amount, and the water content is too high to use them as compost, which leads to decrease in efficiency as low-heating value is reduced, and there are also difficulties in utilizing them as compost since a large area for decay is required and their volume is large.

However, since the oil content is high and the contents of the neutral detergent fiber and the acid detergent fiber are high, the value as feed can be greatly increased if the lactic acid fermentation is achieved.

In Korea, there has been no study for this since oily seeds are not produced due to the differences such as weather, and such studies are insufficient in tropical areas.

In the present invention, in order to solve the problems, the physicochemical properties have been studied, which enable to use the empty fruit bunch and the palm fiber as feed resources.

To this end, the empty fruit bunch and the palm fiber were cut as soon as they are generated in order to prevent the decay, and stored in a raw material storage tank 3 for a short time, and injected in a fixed amount into a first mixer 6 and melted in clean water at a syrup concentration of 25% or less in order to adjust the water content to be 70% or less to supply the water and the soluble sugar, and then dispersed so as to enhance the fermentation of microorganisms.

Furthermore, a large quantity of minerals (Ca, Mg, K, etc.), which are required for producing feeds, were added and mixed, and in order to supply proteins which are lack in the empty fruit bunch and the palm fiber, palm kernel cake (PKC) and the palm oil decanter cake (PODC) powders were introduced to balance nutrition, and they are sufficiently mixed and vacuum-packed, so that they can be used as feed after 30 days or more.

As such, the water conditions which maximize the activation of microorganisms are adjusted to maintain the stable state, and when microorganisms are activated, poly phenol is first combined from the metabolism material with a focus on primary or secondary soluble protein, thereby minimizing toxicity, and insufficient protein can be supplied by utilizing the palm kernel cake (PKC), and the growth of microorganisms can be promoted by supplying soluble sugar.

In addition, minerals which are lack in the empty fruit bunch and the palm fiber, can be supplied by supplying essential mineral matters, and the environment where they are decayed is minimized through vacuum packing, thereby obtaining improved feed resources.

Hereinafter, the equipment for producing fermented fibered feed using palm by-products according to the present invention will be explained in detail with reference to the attached drawings.

The equipment for producing fermented fibered feed using palm by-products according to the present invention greatly comprises a cutter 2, a raw material storage tank 3, a clean water storing tank 15, a sugar storage tank 7, a sugar melting tank 8, a first mixer 6, a protein storage tank 9, a mineral storage tank 12, a second mixer 17, a dual compressor 19, a packing device 20, and a maturing storage tank 22.

The cutter 2, which is the component of the present invention, is configured so that a raw material 100 containing any one selected from the empty fruit bunch and the palm fiber is supplied at its one side and configured to cut the supplied raw material into a constant size.

Since it is hard to mix and process the empty fruit bunch and the palm fiber when they are discharged after the oil mill process because the length is long, the empty fruit bunch and the palm fiber are injected into the cutter 2 via a transfer conveyer 1 illustrated, as soon as they are generated.

In addition, the size cut at the cutter 2 is preferably between 30 and 50 mm.

The cutter 2 for this preferably consists of a two-step mincer.

As such, if it goes through the cutting process, the empty fruit bunch and the palm fiber are changed into the physical size for which the mixing and processing are easy, and this enable to give roughage factor so as to improve the availability of fiber for a ruminant.

The raw material storage tank 3, which is the component of the present invention, is preferably provided with a screw conveyer at its bottom as illustrated, and this serves as storing the raw material cut at the cutter 2 for a short time.

The screw conveyer at the bottom of the raw material storage tank 3 facilitates the transfer of the stored raw material.

In addition, in the raw material storage tank 3, a fixed amount metering device 4 and a transfer conveyer 5 are installed as illustrated for the transfer of the fixed amount to a first mixer 6 to measure the fixed amount at the fixed amount metering device 4 so that the fixed amount is supplied to the first mixer 6 via the jointed transfer conveyer 5.

The clean water storing tank 15, which is the component of the present invention, is configured to melt sugar and transfer it to the first mixer 6, wherein clean water 200 is stored in order to adjust the water in the raw material constant.

To this end, it is preferable that a clean water supply pump 16 for transfer of the clean water is provided between the clean water storing tank 15 and the sugar melting tank 8.

In the sugar storage tank 7, which is the component of the present invention, soluble sugar, for example, syrup is stored.

The sugar melting tank 8, which is the component of the present invention, is pipe-connected with the sugar storage tank 7 and the clean water storing tank 15 as illustrated so that sugar 300 such as syrup and the clean water are introduced, and this serves as melting the sugar into the clean water.

To this end, the sugar melting tank 8 is provided with an injection port at its two upper parts and with a discharge port at its bottom so that a melted liquid phase is discharged.

In addition, a stirring blade is installed therein so that the sugar can be evenly melted in the clean water.

The first mixer 6, which is the component of the present invention, is connected with the raw material storage tank 3 and the sugar melting tank 8 via a pipe or the transfer conveyer 5 as illustrated, so that the raw material and the sugar melted in the clean water are injected therein and the raw material and the sugar melted in the clean water are mixed.

The reason why the mixing is separately performed in the first mixer 6 and the second mixer 17, which will be explained below, is that the first mixer 6 serves as inducing so that the raw material contains a proper amount of water and the sugar can be evenly mixed.

It is preferable that the raw material mixed with the clean water in which the sugar is melted at the first mixer 6, i.e. the first mixture prepared at the first mixer 6 is mixed so that the raw material contains water in the range of 70% or less.

In the protein storage tank 9, which is the component of the present invention, a protein source 400 is stored.

As a protein source, various known proteins can be used, but it is preferable that the protein source is configured to consist of one selected from palm kernel cake (PKC) or palm oil decanter cake (PODC) powder, which is generated during the palm oil mill process, or comprise them.

Herein, the protein source is preferably added by 6 to 10 parts by weight on the basis of 100 parts by weight of the raw material.

To this end, subsequent to the protein storage tank 9, it is preferable that a supply conveyer 10 and a fixed amount metering deice 11 are consecutively installed.

The mineral storage tank 12, which is the component of the present invention, is to provide components such as essential mineral necessary as a raw material of feed as illustrated, and in the mineral storage tank 12, several kinds of minerals 500 can be mixed and stored, and the components that the minerals mainly contain are preferably components such as macro mineral, Ca, Mg, K, and the like.

Herein, the mineral is preferably added by 0.2 to 0.7 parts by weight on the basis of 100 parts by weight of the raw material.

To this end, subsequent to the mineral storage tank 12, it is preferable that a supply conveyer 13 and a fixed amount metering device 14 are consecutively installed.

The second mixer 17, which is the component of the present invention, serves as mixing the raw materials discharged at the first mixer 6, the protein storage tank 9 and the mineral storage tank 12.

Herein, it is preferable that the second mixer mixes the raw materials, water, sugar, protein and mineral for a sufficient time so that the substances are not separately from each other.

To this end, the second mixer preferably consists of a ribbon mixer or pedal mixer.

Subsequent to the second mixer 17, it is preferable that a mixture transfer conveyer 18 is installed so that the second mixture is supplied to a dual compressor 19 which will be explained.

The dual compressor 19, which is the component of the present invention, is configured to receive the raw material mixed at the second mixer 17 and dual-compress it.

The reason that the dual compression manner is selected is to remove oxygen as much as possible in the compression process.

The packing device 20, which is the component of the present invention, is configured to pack the raw material dual-compressed at the double compressor 19 illustrated.

Herein, the packing device 20 preferably consists of a packing device in a vacuum packing manner so that the compressed raw material is blocked from the external air.

The maturing storage tank 22, which is the component of the present invention, is configured so that the raw material discharged at the packing device 20 is introduced therein along a package transfer conveyer 21 and configured to mature and store the packed raw material.

It is preferable to use the maturing storage tank 22 in which the internal temperature can be maintained constantly due to a hot wire, etc., and the internal temperature of the maturing storage tank 22 is preferably maintained between 23 and 35° C.

Below, a method of producing fermented fibered feed by using the equipment for producing fermented fibered feed using palm by-products according to the present invention configured as above will be explained in more detail.

1. Cutting Step

The raw material containing any one selected from the empty fruit bunch and the palm fiber is cut into a length of 10 to 50 mm using the cutter 2 and then stored in the raw material storage tank 3.

2. Sugar Melting Step

The clean water stored in the clean water storing tank 15 and the soluble sugar stored in the sugar storage tank 7 are mixed in the sugar melting tank 8 so that the soluble sugar is melted in the clean water.

Herein, since the water content of the raw material discharged after the oil mill process is approximately 60 to 65%, it is preferable that the water content of the raw material after the primary mixing is 70%, and in consideration of the paratability and nutrition, the melting concentration of the sugar in the clean water in the sugar melting step is preferably 22 to 28%.

In addition, it is preferable that the clean water in which the soluble sugar is melted is mixed by 3 to 15 parts by weight with respect to 100 parts by weight of the cut raw material.

Herein, if it is necessary to increase the supply of sugar, wheat bran can be added and stored in the sugar storage tank 7 or protein storage tank 9.

3. First Mixing Step

The cut raw material stored in the raw material storage tank 3 and the clean water in which soluble sugar is melted at the sugar melting tank 8 are mixed using the first mixer 6 to prepare a first mixture.

4. Second Mixing Step

The protein source containing any one selected from the palm kernel cake and palm oil decanter cake stored in the protein storage tank 9, the mineral stored in the mineral storage tank 12, and the first mixture are mixed at the second mixer 17 to prepare a second mixture.

Herein, the protein source is preferably added by 5 to 25 parts by weight, more preferably, 6 to 10 parts by weight, on the basis of 100 parts by weight of the cut raw material.

In addition, the mineral is preferably added by 0.2 to 0.7 parts by weight on the basis of 100 parts by weight of the cut raw material.

5. Compressing Step

The second mixture is dual-compressed at the dual compressor 19.

6. Packing Step

The second mixture which goes through the compression step is vacuum-packed at the packing device 20.

7. Maturing Step

The secondary mixture which goes through the packing step is matured at the maturing storage tank 22.

The matured second mixture is discharged through the discharge conveyer 23 as illustrated.

The maturing step is preferably performed for 30 to 90 days at a temperature of 23 to 35° C.

As one preferred embodiment, the raw materials to be processed, i.e. empty fruit bunch (EFB) and palm fiber (PF), are transferred to a storage tank through the cutting process as soon as they are generated, and the water content of the transferred raw materials is measured to determine the amount of water to be added.

The raw material for which the analysis was completed is injected into the clean water by adjusting the concentration to 25% and then melted and supplied so that this can be well mixed together with the water by means of spray, wherein the water content of the raw material is controlled to 75% or less.

Into the raw material for which the control of the water is completed, palm kernel cake (PKC) with a high amount of protein, or dried palm oil decanter cake (PODC) powder is introduced in an amount of 8% or less in order to provide a nitrogen supply source for lactic acid fermentation, and a mixture (pre-mineral mixture) of a large quantity of mineral matters (macro mineral; Ca, Mg and K) is introduced in an amount of 0.5 and sufficiently mixed in the second mixture, the mixed raw material is packed by means of a vacuum packer and sealed and stored so that air is not introduced from the outside, and the lactic acid fermentation well occurs.

After feeds are prepared according to the present invention, the number of microorganisms, the content of organic acid, the content of soluble poly phenol, pH, and flavor relative evaluation were studied after the treatment, 1 month, 2 months and 3 months after the maturing, as shown in the following table.

TABLE 1

| | | Maturing period | | |
|---|---|---|---|---|
| Item | After the preparation | 1 month | 2 months | 3 months |
| The number of microorganisms (CFU/g) | $1.5 \times 10^2$ | $2.54 \times 10^3$ | $2.77 \times 10^6$ | $1.89 \times 10^7$ |
| The content of organic acid (mg/g) | 0.1 | 0.3 | 15.3 | 250.6 |
| The content of soluble poly phenol (mg/kg) | 5,115.3 | 4,589.6 | 2,786.9 | 1,890.3 |
| pH | 7.89 | 6.98 | 6.23 | 5.16 |
| Flavor relative evaluation (1: the lowest, 4: the highest) | 1 | 2 | 3 | 4 |

As shown in the above table, the present invention greatly increase the activation of microorganisms, so the toxicity of poly phenol can be greatly reduced, and lactic acid fermentation occurs, which improves the flavor, thereby improving the paratability.

In addition, the lactic acid is stably fermented to greatly reduce the degree of decay, which results in high flavor.

In particular, it has been known that poly phenol decreases the paratability and reduces the digestive power and the availability of other nutrients, but as shown in the table, it can be understood that the toxicity of solubility is greatly decreased along with the increase of microorganisms.

During the maturing process, it showed that pH is decreased. This is caused by the lactic acid fermentation, and due to this, the decay would be reduced and the flavor and the paratability as feed would be improved.

INDUSTRIAL APPLICABILITY

The present invention is to develop a novel method capable of producing a product which improves an added value of a large amount of empty fruit bunch (EFB) and palm fiber (PF), which are generated during the palm oil mill process, as the industrial importance grows and the culturing area is gradually expanded in the world, and its growth is expected to be greatly increased. In particular, the industrial value of utilizing empty fruit bunch (EFB) and palm fiber (PF), which have been considered as waste, as novel roughage source is very high in the palm industry and the demand would be greatly increased in Japan, Korea, and China.

What is claimed is:

1. An equipment for producing fermented fibered feed using palm by-products, comprising:
    a cutter (2) configured so that a raw material is selected from the group consisting of empty fruit bunch and a palm fiber and is supplied at its one side, and configured to cut the supplied raw material into a constant size of 10-50 mm;
    a raw material storage tank (3) that stores the raw material cut at the cutter (2);
    a clean water storing tank (15) in which clean water is stored;
    a sugar storage tank (7) in which soluble sugar is stored;
    a sugar melting tank (8) connected with the clean water storing tank (15) and the sugar storage tank (7) and in which the clean water and the soluble sugar are supplied so that the sugar is melted in the clean water, wherein a melting concentration of the soluble sugar in the clean water is 22 to 28%;
    a clean water supply pump (16) transferring the clean water and being located between the clean water storing tank (15) and the sugar melting tank (8);
    a first mixer (6) connected with the sugar melting tank (8) and the raw material storage tank (3), that receives and mixes the sugar melted in the clean water and the cut raw material, wherein a water content of the mixed cut raw material is 70%;
    a protein storage tank (9) in which a protein source containing any one selected from palm kernel cake (PKC) or palm oil decanter cake (PODC) powder is stored;
    a mineral storage tank (12) in which mineral is stored;
    a second mixer (17) that mixes the materials discharged from the first mixer (6), the protein source from the protein storage tank (9) and the mineral from the mineral storage tank (12);
    a dual compressor (19) configured to receive the material mixed at the second mixer (17) and dual-compress it;
    a packing device (20) that packs the material dual-compressed at the double compressor (19); and
    a maturing storage tank (22) that stores the material packed at the packing device (20).

2. The equipment as claimed in claim 1, wherein the second mixer (17) is selected from a ribbon mixer or pedal mixer.

3. A method of producing fermented fibered feed using palm by-products, comprising:
    a step of providing the equipment of claim 1;
    a cutting step of cutting a raw material selected from the group consisting of empty fruit bunch and palm fiber into a length of 10 to 50 mm using the cutter (2) and then storing the cut raw material in the raw material storage tank (3);
    a sugar melting step of mixing clean water stored in the clean water storing tank (15) and soluble sugar stored in the sugar storage tank (7) in the sugar melting tank (8) so that the soluble sugar is melted in the clean water and wherein a melting concentration of the soluble sugar in the clean water is 22 to 28%;
    a first mixing step of mixing the cut raw material stored in the raw material storage tank (3) and the clean water in which soluble sugar is melted at the sugar melting tank (8) using the first mixer (6) to prepare a first mixture;
    a second mixing step of mixing a protein source containing any one selected from palm kernel cake and palm oil decanter cake stored in the protein storage tank (9), at least one mineral stored in the mineral storage tank (12), and the first mixture at the second mixer (17) to prepare a second mixture;
    a compressing step of dual-compressing the second mixture at the dual compressor (19);
    a packing step of packing the second mixture which goes through the compressing step at the packing device (20); and
    a maturing step of maturing the second mixture which goes through the packing step at the maturing storage tank (22).

* * * * *